Oct. 30, 1956   J. H. GIFFORD ET AL   2,769,129
MAGNETIC AMPLIFIER SPEED CONTROL OF DIRECT CURRENT MOTOR
Filed May 14, 1954

WITNESSES:
E. A. McCloskey.
Wm. B. Sellers.

INVENTORS
Joseph H. Gifford
and Franklin S. Malick.
BY
Paul E. Friedemann
ATTORNEY

United States Patent Office 2,769,129
Patented Oct. 30, 1956

2,769,129

MAGNETIC AMPLIFIER SPEED CONTROL OF DIRECT CURRENT MOTOR

Joseph H. Gifford, Severna Park, Md., and Franklin S. Malick, Milwaukee, Wis., assignors to Westinghouse Electric Corporation, East Pittsburgh, Pa., a corporation of Pennsylvania Application May 14, 1954, Serial No. 429,838

7 Claims. (Cl. 318—327)

Our invention relates to electric systems of control for electric motors and more particularly to electric systems for controlling the speed of operation of direct current motors.

In many situations in industry it is desirable to control the operation of a direct current motor from a source of alternating current. When it is necessary to regulate the speed of a direct current motor within very close limits then the control of the voltage to be supplied to the motor armature is the most desirable because this type of control has very much shorter time delay than field excitation control.

Certain prior art systems of control, for the service here being discussed, depended on the use of controlled magnetic amplifiers. Magnetic amplifiers, when used to supply armature power to standard direct current motors, provide a system with good efficiency but such previous systems required that all the power needed by the motor be rectified power from a source of alternating current. This requires large magnetic amplifiers and large rectifiers.

One broad object of our invention is the provision of a more efficient and more simple, and thus less expensive, magnetic amplifier control for the supply voltage of the armature of a direct current motor than heretofore known in the art.

A more specific object of our invention is the provision of a magnetic amplifier control for the voltage supply of the armature of a direct current motor which control supplies only a part of the energy being supplied to the motor armature.

Another specific object of our invention is the provision of a source of alternating current supply voltage and a source of direct current supply voltage for the armature of a direct current motor and the provision, through self-saturating magnetic amplifiers, to so regulate and alter the fraction of the direct current energy supplied to the motor armature terminals from the source of alternating current so as to maintain the motor speed at a selected value regardless of variations in motor torque, and variations in the direct current and alternating current voltages of the two sources of supply.

Figure 1:
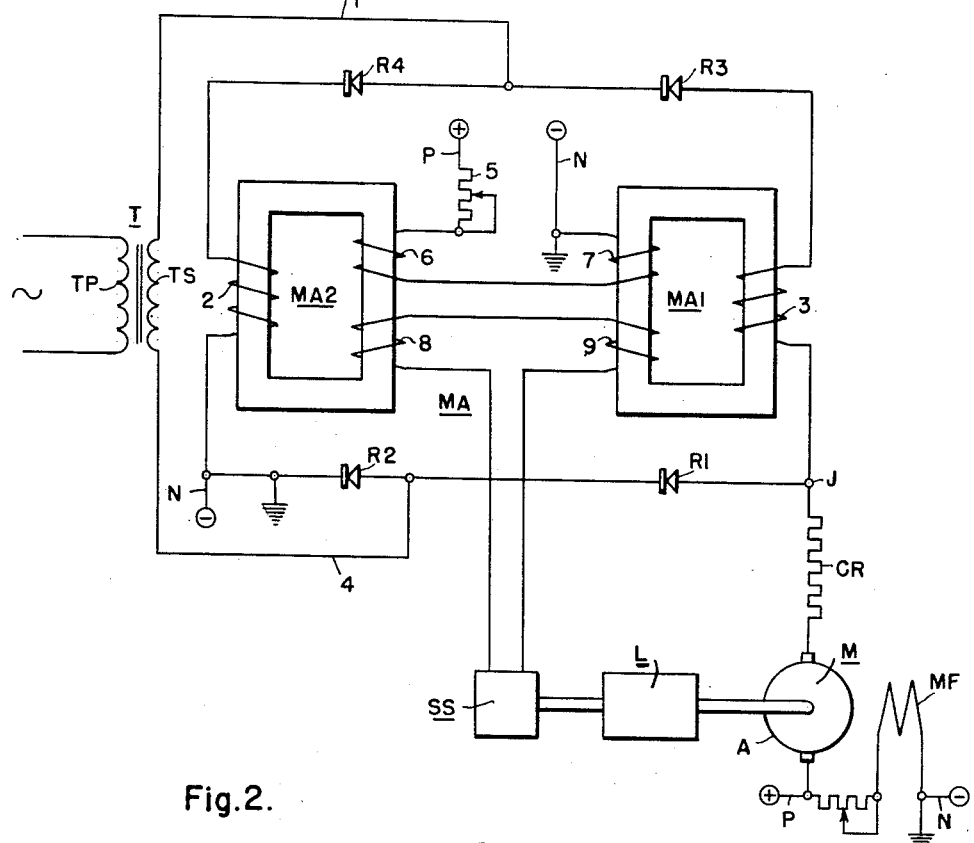
Figure 2:
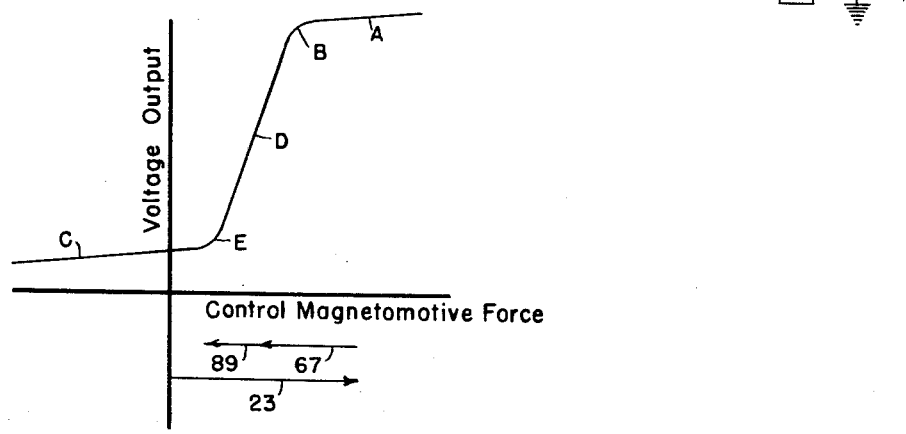

The objects stated are merely illustrative. Other objects and advantages will become more apparent from a study of the following specification and the accompanying drawings, in which:

Fig. 1 is a diagrammatic showing of our system of control as applied to a direct current motor; and Fig. 2 shows a curve illustrating the operating characteristics of the magnetic amplifier used.

In Fig. 1 it will be noted that the motor M is shown as a separately excited motor, namely a motor having its field winding MF connected through a suitable rheostat across the positive supply lead P and the grounded negative supply lead N.

The motor is coupled to drive a sutiable load L and is also shown as being coupled to a sutiable speed sensing device SS for producing a voltage output at its output leads that is a function of the speed of motor M. The speed sensing device may be any device producing a signal that is indicative of the speed error of the speed with respect to which the motor is to be regulated. The speed sensing device may thus be responsive to motor counter-electromotive force, shaft speed, or some independent speed reference voltage signal affected by the motor speed. The showing in Fig. 1 is merely illustrative. In the preferred selection of a speed sensing device it may be either of two types: (a) Absolute, such as a tachometer, in which an output voltage proportional to speed is obtained, or (b) Comparison, in which an output voltage proportional in magnitude and phase to the difference between the regulated speed and the actual speed is obtained.

The direct current supply for the motor armature, the biasing windings for the magnetic amplifier parts MA1 and MA2, and the motor field winding MF is represented by the positive and negative leads P and N, respectively. The armature circuit may be traced from the positive lead P through the armature A of the motor M, the control resistor CR, junction J and the two rectifiers R1 and R2 in series to the grounded negative terminal N. A circuit in parallel to the two rectifiers R1 and R2 may be traced from junction J through the main winding 3 of the magnetic amplifier element MA1, the rectifiers R3 and R4, the main winding 2 of the magnetic amplifier element MA2 to the negative lead N. From the armature circuits just traced it is apparent that the motor armature, disregarding for the moment the output of the magnetic amplifier, is excited from the direct current source.

By our system of control it is possible to supply the major portion of the power required by the motor from the separate direct current supply, i. e. from leads P and N and the remaining relatively small portion of the power required by the motor M is supplied by the magnetic amplifier.

The transformer T, having the primary windings TP and the secondary windings TS, supplies this relatively small portion of direct current energy through the magnetic amplifier and rectifiers shown. The energizing circuits may be traced from the transformer secondary winding through conductor 1, when this conductor is positive, through rectifier R4, main winding 2 of magnetic amplifier element MA2 to lead N, through the direct current supply to lead P, the omtor armature A, control resistor CR, junction J, rectifier R1 to the lead 4, now negative. On the second half wave when lead 4 is positive the output current of the magnetic amplifier flows from lead 4 through rectifier R2, lead N, the direct current supply to lead P, the armature A, control resistor CR, junction J, main winding 3 of the magnetic amplifier element MA1 and rectifier R3 to lead 1, now negative.

From the circuits just traced it is apparent that the magentic amplifier supplies direct current energy of the same polarity as the supply to the motor.

The direct current supply voltage may have any value desired but it is apparent that the value selected will determine the motor to be selected, the resistor CR to be selected, and the magnetic amplifier to be selected.

To facilitate the disclosure of our invention let the assumption be that motor M is a 28 volt machine and that the supply voltage is not likely to vary more than four volts above and four volts below the rated motor voltage. The control resistor CR is then so selected that when the supply voltage is 32 volts a four volt drop is dissipated in the control resistor and the magnetic amplifier and constants for the circuitry are so selected and adjusted that the magentic amplifier supplies substantially no boosting voltage when the supply voltage is at 32 volts and supplies eight volts of boosting voltage when the supply is at 24 volts.

In Fig. 2, the characteristics of the magnetic amplifiers are indicated by curve C. Let us assume that each element of the magnetic amplifier operates at point A when energized by windings 2 and 3 only. In other words, vector 23 determines the operating point A. The energization of the biasing windings 6 and 7 is adjusted to cause the magnetic amplifier to operate at point D. The vector 67 represents the effect produced. The operating point D may of course be at any convenient point on curve C as at points B or E.

The output of the speed sensing device SS being supplied to control windings 8 and 9 is so selected that it will have substantially zero value when the motor speed is sufficiently low to cause the magnetic amplifiers to operate at point B. In other words when the supply voltage is at 24 volts the magnetic amplifiers will operate at point B and supply 8 volts of boosting voltage to bring the voltage at the motor armature terminals up to the 28 volts desired.

Should the supply voltage be at 32 volts then the motor will tend to run too fast. The output of the device being supplied to control windings 8 and 9 will now rise so that its effect on the magnetic amplifier, represented by the vector 89, will be to reduce the boosting voltage to zero. The motor armature terminals will again be supplied with rated voltage and the motor will run at the desired speed.

Under the latter condition, namely, when the supply is at 32 volts, a control signal from the speed error detector device SS reduces the magnetic amplifier output to nearly zero and the excess voltage from the supply appears as a drop across the control resistor CR, the forward resistance of the rectifier means, and the reactor winding resistance so that the rated volts appear at the motor armature terminals.

When the supply volts are at a low 24 volts the motor would tend to run too slow. A control signal is now provided by the speed error detecting device SS to cause the magnetic amplifiers to have a high output voltage, part of which would be applied to the motor armature to bring the speed up, and part of which would be a drop across resistor CR and the other elements in the circuit.

It is true that the voltage drop in control resistor CR represents wasted output from the magnetic amplifier. Even with this waste the magnetic amplifier needed in our control is considerably smaller and thus cheaper than would be needed if the magnetic amplifier supplied the entire required armature power.

An important feature of our invention is the use of the control resistor CR so that speed regulation can be obtained with the armature voltage equal to the average direct current bus voltage. A standard motor may thus be selected. Without the resistor a motor wound for a higher voltage would be required.

The control is preferably so adjusted that the magnetic amplifier output varies from point E to point B with the vector 89 having half its maximum length when the supply voltage is at 28 volts so as to operate the magnetic amplifier at point D.

While we have shown but one diagrammatic arrangement of our invention, it is to be understood that our invention is capable of various adaptations and that changes and modifications may be made or substitutions resorted to which come within the spirit of our invention herein set forth.

We claim as our invention:

1. In a system of control for direct current motor, in combination, a direct current motor having armature windings and field windings excited at a substantially constant value, direct current supply terminals interconnected with the motor armature winding to energize the motor, supply terminals energized with alternating current, magnetic amplifier means interconnected with the alternating current supply terminals and the motor armature windings for controlling the voltage supplied to the motor armature winding from said direct current supply terminals, and control means responsive to the speed of the motor for controlling the output of the magnetic amplifier means in accordance with the departure of the motor speed from a selected speed.

2. In an electric system of control, in combination, a direct current motor having an armature winding and a field winding, a pair of direct current supply terminals, circuit means for connecting the field winding to said terminals for energizing the field winding, circuit means for connecting the motor armature winding to said terminals for energizing the motor, a self-saturating magnetic amplifier, including main winding means and rectifier means, also interconnected with the motor armature winding to thus energize the motor with an additional direct current component voltage which varies in proportion to the output of the magnetic amplifier, said magnetic amplifier having a biasing winding in use energized at a selected value for biasing the magnetic amplifier to a certain point of operation on its output characteristic, a control winding for said magnetic amplifier, and means for so energizing the control winding as to increase the magnetic amplifier output with a decrease of the voltage at the motor armature winding and to decrease the magnetic amplifier output with an increase of the voltage at the motor armature terminals.

3. In an electric system of control, in combination, a direct current motor having an armature winding and a field winding, a pair of direct current supply terminals, circuit means for connecting the field winding to said terminals for energizing the field winding, circuit means for connecting the motor armature winding to said terminals for energizing the motor, a self-saturating magnetic amplifier, including main winding means and rectifier means, also interconnected with the motor armature winding to thus energize the motor with an additional direct current component voltage which varies in proportion to the output of the magnetic amplifier, said magnetic amplifier having a biasing winding energized to cause the magnetic amplifier to normally operate at a certain point and its output characteristic, a control winding for the magnetic amplifier, and means responsive to the departure of the motor from a selected speed for energizing the control winding in accordance with the speed error signal.

4. In an electric system of control, in combination, a direct current motor having an armature winding and a field winding, means for energizing the field winding at a substantially constant value, a pair of direct current terminals energized with a direct current voltage that may vary a certain number of volts above the normal value and a certain number of volts below the normal value, a control impedance, circuit means for connecting the control impedance in series with the motor armature winding across said direct current supply terminals, the impedance value of said control impedance being so selected that the voltage drop across said impedance, when the voltage of the supply is at its maximum expected value, is equal to the difference between the normal voltage and said maximum value, a self-saturating magnetic amplifier, including main windings and rectifier means, energized from a suitable source of alternating current, said magnetic amplifier being also interconnected with the motor armature winding to thus energize the motor with an additional direct current component voltage which varies as a function of the output of the magnetic amplifier, said magnetic amplifier having two control windings, an adjustable reference voltage for one control winding for biasing the magnetic amplifier to a certain point of operation on its output characteristic, and means for so variably energizing the other control winding in accordance with an operating characteristic of the motor to vary the magnetic amplifier voltage output to vary oppositely to the voltage variation of the supply from normal over the whole range of variation of the supply.

5. In an electric system of control, in combination, a direct current motor having an armature winding and a field winding, means for energizing the field winding at a substantially constant value, a pair of direct current terminals energized with a direct current voltage that may vary a certain number of volts above the normal value and a certain number of volts below the normal value, a control impedance, circuit means for connecting the control impedance in series with the motor armature winding across said direct current supply terminals, the impedance value of said control impedance being so selected that the voltage drop across said impedance, when the voltage of the supply is at its maximum expected value, is equal to the difference between the normal voltage and said maximum value, a self-saturating magnetic amplifier, including main windings and rectifier means, energized from a suitable source of alternating current, said magnetic amplifier being also interconnected with the motor armature winding to thus energize the motor with an additional direct current component voltage which varies as a function of the output of the magnetic amplifier, said magnetic amplifier having a bias winding energized to normally cause the magnetic amplifier to operate at a certain point on its output characteristics, a control winding for the magnetic amplifier adapted to alter the output of the magnetic amplifier over a range substantially twice the value of the voltage drop across said control impedance, and means responsive to the departure of the motor from a selected speed for energizing the control winding in accordance with the error signal.

6. In an electric system of control, in combination, a direct current motor having an armature winding and a field winding, means for energizing the field winding at a substantially constant value, a pair of direct current terminals energized with a direct current voltage that may vary a certain number of volts above the normal value and a certain number of volts below the normal value, a control impedance, circuit means for connecting the control impedance in series with the motor armature winding across said direct current supply terminals, the impedance value of said control impedance being so selected that the voltage drop across said impedance, when the voltage of the supply is at its maximum expected value, is equal to the difference between the normal voltage and said maximum value, a self-saturating magnetic amplifier, including main windings and rectifier means, energized from a suitable source of alternating current, said magnetic amplifier being also interconnected with the motor armature winding to thus energize the motor with an additional direct current component voltage which varies as a function of the output of the magnetic amplifier, said magnetic amplifier having a biasing winding in use energized at a selected value for biasing the magnetic amplifier to a certain point of operation on its operating characteristic, a control winding for the magnetic amplifier, and means for energizing the control winding so as to increase the magnetic amplifier output in proportion to the voltage drop across said control impedance and the decrease in voltage at the motor armature terminals and to decrease the magnetic amplifier output with an increase of the voltage at the motor armature terminals.

7. In an electric system of control for a direct current motor, in combination, a pair of direct current supply terminals, a control impedance, a direct current motor having a field winding energized at a substantially constant value and having an armature winding connected in series with the control impedance across said direct current terminals, the impedance value of said control impedance being so selected that its voltage drop, when the supply voltage is at the maximum expected value above normal is equal to the difference between the normal supply voltage and said maximum value, magnetic amplifier means energized from a suitable source of alternating current connected to the armature winding of said motor, and means for varying the output of the magnetic amplifier in an opposite sense so the voltage component of the magnetic amplifier is substantially equal to said voltage variation of the supply, whereby the voltage at the motor armature terminals is maintained substantially constant.

References Cited in the file of this patent
UNITED STATES PATENTS 2,675,513    Malick  ---------------- Apr. 13, 1954